Patented Apr. 10, 1951

2,547,938

UNITED STATES PATENT OFFICE 2,547,938

MANUFACTURE OF ALKYL BENZENE PEROXIDES

Reginald Harold Hall, Sutton, and Denis Cheselden Quin, Epsom, England, assignors, by mesne assignments, to Hercules Powder Company, a corporation of Delaware No Drawing. Application April 1, 1947, Serial No. 738,726. In Great Britain April 8, 1946

14 Claims. (Cl. 260—610)

This invention relates to an improvement in or a process for the oxidation of alkyl benzenes and to the production of peroxides thereof. It refers in particular to the oxidation by means of molecular oxygen of alkyl benzene hydrocarbons in which the substituents are one or more alkyl groups at least one of which has a tertiary carbon atom in the alpha-position to the benzene ring.

According to the prior U. S. A. Patent No. 2,302,466, cymene can be oxidised in the liquid phase by means of molecular oxygen in the presence of oxides, hydroxides or carbonates of heavy metals such as manganese, lead, cobalt and the like, as catalysts. The oxidation product consists chiefly of cumic acid, some dimethyl carbinol and p-methyl-acetophenone. Very small amounts of peroxides are formed in addition.

It has been stated (Journal of the American Chemical Society, volume 48 (1926), page 2920) that 25 g. cumene when oxidised by passing oxygen through said compound at 102°–104° C. for 20 days (in the absence of catalysts, but in the presence of water) yielded 4.6 g. acetophenone, and that 50 g. cymene after oxidation treatment for 18 days yielded 1.8 g. of p-tolylmethyl ketone. In following up the investigation the authors found that in subjecting such compounds as possess a tertiary carbon atom attached to the benzene ring, for instance, methyl-ethyl-phenyl methane, methyl-propyl-phenyl methane, and methyl-butyl-phenyl methane to the same oxidation process, the larger group linked to the tertiary carbon atom is split off with the formation of aceto-phenone or substituted acetophenones. This reaction is stated to be favoured by the presence of water. In 31 to 34 days, however, less than 0.5 to 1.5 g. of the ketone was obtained.

It is further known (Berichte 77 (1944) pages 257–64) that isopropyl-benzene can be oxidised by bringing it into contact with dry oxygen and exposing the reaction mixture concurrently to short wave irradiation. In 24 hours three moles of isopropyl benzene absorbed 0.2 mole of oxygen. The reaction resulted in the formation of isopropyl-benzene peroxide, but the yield of peroxide based on the oxygen used was very poor.

According to the present invention, there is provided a process for the production of peroxides of alkyl benzene hydrocarbons in which the substituents are one or more alkyl groups at least one of which has a tertiary carbon atom in the alpha-position to the benzene ring which comprises oxidising a dispersion or emulsion in an aqueous continuous phase of such an alkyl benzene hydrocarbon or mixtures thereof by intimate contact thereof with molecular oxygen at an elevated temperature. The molecular oxygen may be in the form of pure oxygen or in the form of gas mixtures containing oxygen such as air, and may be applied at ordinary or superatmospheric pressure. The temperature during the oxidation operation is preferably kept near to, but below, the boiling point of the alkyl benzene hydrocarbon-water azeotrope at the prevailing pressure. The ratio of the alkyl benzene hydrocarbon to water may vary within wide limits but is preferably so chosen that a good oil-in-water emulsion is formed in which the oil and water phases will not invert under the conditions of the oxidation. Emulsifying agents, such as sodium stearate, sodium ricinoleate, sodium lauryl sulphate, the sodium salts of sulphates of secondary alcohols such as those sold under the registered trade-mark "Teepol" and the like may be added to the aqueous mixture with great advantage in order to facilitate and improve the dispersion or emulsification of the oil phase in the water phase. Care has to be taken, by very vigorous agitation, that the dispersion or emulsion is mixed efficiently with the gas. It is advantageous to maintain a pH between 7 and 11 in the emulsion or dispersion by the addition of small quantities of alkali metal hydroxides or carbonates. This also hinders the emulsion or dispersion from breaking especially after it has been exposed for some time to the action of oxygen.

In some cases, we have observed that the oxygen is at first absorbed by the emulsion very sluggishly, but after an interval, which may even last for some hours, the absorption proceeds fairly rapidly. We have found that the action of oxygen upon the alkyl benzene hydrocarbon may be improved and considerably accelerated by subjecting the said hydrocarbon to a preliminary purification process, such as washing with aqueous sodium bisulphite or potassium permanganate solutions. We have found, furthermore, that the alkyl benzene hydrocarbon recovered from a previous oxidation batch after separation from the oxidised product does not show the initial inhibition period during which very little or no oxidation takes place.

The reaction product resulting from the process of the invention consists chiefly of the peroxide of the alkyl benzene hydrocarbon which expression is used throughout this specification to include a peroxide and/or a hydroperoxide.

The introduction of oxygen into the reaction mixture is preferably terminated when about one third to one half of the initial alkyl benzene hydrocarbon has been converted into the peroxide thereof. In this manner the formation of undesirable by-products is minimised.

The peroxide may be recovered from the oxidation mixture in any convenient manner. For instance, after the reaction is completed, or the oxidation has been interrupted, and the emulsion has been allowed to break, with or without the addition of an acid, the oily layer containing the peroxide in admixture with the unoxidised alkyl benzene hydrocarbon is separated from the aqueous layer. It may then be treated with a concentrated alkaline solution, preferably an alkali metal hydroxide, whereupon the major proportion of the peroxide formed crystallises out as its alkali metal salt. By acidification of the remaining mother liquor, some free peroxide can be recovered. Another method of recovering the peroxide comprises shaking the reaction mixture with an excess of a dilute aqueous alkali metal hydroxide solution whereby, according to its solubility, the alkali metal salt of the peroxide passes into the aqueous layer and is thereby separated from the un-oxidised starting material. By acidifying an aqueous solution of the sodium salt by means of a weak acid e. g. by carbonic acid, the free peroxide can be regenerated and may be recovered. A further method of recovering the peroxide consists in evaporating or distilling off, preferably in vacuo, any unoxidised alkyl benzene hydrocarbon from the reaction mixture leaving the peroxide as residue.

The oxidation process according to this invention may be applied with special advantage to the oxidation of isopropyl-benzene and p-cymene. In the following example, the process is illustrated by the oxidation of isopropyl-benzene and the production therefrom of isopropyl-benzene peroxide. It should be understood however, that the reaction may be applied to compounds of the general formula $R_n{}^3$—$C_6H_5$—$_n$—$CHR^1R^2$ wherein $R^1$ and $R^2$ are alkyl groups such as methyl, ethyl, propyl or butyl and $R^3$ is either an H atom or an alkyl group such as methyl or ethyl, $n$ being a whole number between 0 and 5 inclusive.

*Example 1.*—A mixture of 200 ccs. of isopropyl benzene, 400 ccs. of distilled water and 0.3 g. of sodium stearate, was stirred vigorously at 85° C. and a current of oxygen (95% purity) was passed through the mixture. The apparatus employed was of such a design that the unabsorbed gas was continuously recycled through the liquid.

The oxidation commenced slowly but the rate of oxidation gradually increased. Small amounts of caustic soda solution were added from time to time to maintain the emulsion. At the end of 14 hours, 13 litres of oxygen (calculated at N. T. P.) had been absorbed.

The reaction mixture was cooled and saturated with carbon dioxide. The oil layer which separated had a volume of 200 ccs. and contained 69.4 g. of isopropyl benzene hydroperoxide. The yield of peroxide was 79% of theory based on the amount of oxygen absorbed and the peroxide was produced at the overall rate of 0.0226 mol per mol of isopropyl benzene per hour.

*Example 2.*—200 ccs. of a mixture of cymenes and 400 ccs. of distilled water containing 0.7 g. of sodium stearate and 5.3 g. of sodium carbonate (to act as a buffer) were charged into a similar type of vessel to that used in Example 1, after prior emulsification in an emulsifier; the pH of the emulsion was 10.4.

In order to shorten the induction period, 0.5 g. of isopropyl benzene hydroperoxide were added, and oxygen was fed in from a cylinder. The oxidation vessel was immersed in a thermostatically controlled water bath maintained at 90° C. initially, but this temperature was lowered to 85° C. after the first few hours.

After 12 hours, the rate of peroxide production reached a maximum, oxygen being absorbed at the rate of 800 ccs. per hour. On stopping the oxidation at this time, 19 g. cymene hydroperoxide were estimated to be present.

The peroxides of the alkyl benzene hydrocarbons are of great value both in their free state and as alkali salts, as they may be employed as polymerisation accelerators for single phase or emulsion polymerisations or as intermediates for the manufacture of phenol, acetophenone, or phenyl dialkyl carbinols.

*Example 3.*—500 ccs. of water containing 5 g. of sodium carbonate and 250 ccs. of a mixture of secondary butyl-toluenes (boiling point range, at 730 mm., of 192° to 193°) in which 0.25 g. of stearic acid was dissolved, were agitated thoroughly by means of a recycle stirrer. The mixture was heated to 85° C. and oxygen introduced. After an induction period of 1 hour, oxidation of the butyltoluenes began very slowly. In order to accelerate the reaction, 1 g. of caproyl peroxide was added as initiator. The absorption rate of the oxygen increased gradually from 20 ccs./hr. to 140 ccs./hr. The temperature was then raised to 90° C. and the rate of oxygen absorption slowly rose to 350 ccs./hr. Over 95% of the oxygen consumed in the reaction reacted to produce peroxide which was obtained finally as a 10% solution, calculated as sec.-butyltoluene hydro-peroxide, in the butyl-toluene phase. The maximum rate of production was approximately 1% by weight of butyltoluene peroxide per hour.

The use of initiators in such oxidation reactions is well-known, the initiators being, in general, peroxides of which another example is benzoyl peroxide.

We claim:

1. A process for the production of peroxides of alkyl benzenes which comprises oxidising an alkyl benzene hydrocarbon, containing an alkyl substituent having a tertiary carbon atom in the alpha-position to the benzene ring, in dispersion in a liquid aqueous continuous phase at a pH of about 7 to 11 by the action of molecular oxygen under superatmospheric pressure in intimate contact therewith at an elevated temperature.

2. A process for the production of peroxides of alkyl benzenes which comprises oxidising an alkyl benzene hydrocarbon, containing an alkyl substituent having a tertiary carbon atom in the alpha-position to the benzene ring, in dispersion in a liquid aqueous continuous phase at a pH of about 7 to 11 by the action of molecular oxygen under superatmospheric pressure in intimate contact therewith at a temperature near to but below the boiling point of the alkyl benzene hydrocarbon-water azeotrope at the prevailing pressure.

3. A process for the production of peroxides of alkyl benzenes which comprises oxidising an alkyl benzene hydrocarbon, containing an alkyl substituent having a tertiary carbon atom in the alpha-position to the benzene ring, in dispersion in a liquid aqueous continuous phase at a pH of about 7 to 11 containing an emulsifying agent by the action of molecular oxygen under superatmospheric pressure in intimate contact therewith at an elevated temperature.

4. A process for the production of peroxides of alkyl benzenes which comprises oxidising an alkyl benzene hydrocarbon, containing an alkyl substituent having a tertiary carbon atom in the alpha-position to the benzene ring, in dispersion in a liquid aqueous continuous phase containing an emulsifying agent and having a pH between 7 and 11 by the action of molecular oxygen under superatmospheric pressure in intimate contact therewith at an elevated temperature.

5. A process according to claim 1 wherein said alkyl benzene hydrocarbon is, prior to oxidation, purified by washing with an aqueous solution of sodium bisulphite.

6. A process according to claim 1 wherein said alkyl benzene hydrocarbon is, prior to oxidation, purified by washing with an aqueous solution of potassium permanganate.

7. A process according to claim 1 wherein unoxidised alkyl benzene hydrocarbon recovered from a previous oxidation is added to said dispersion.

8. A process according to claim 1 wherein the oxidation reaction is terminated when from about one third to one half of said alkylbenzene hydrocarbon has been oxidised.

9. A process according to claim 1 wherein the disperse phase is, after the oxidation, separated from the continuous phase by breaking the emulsion and distilled for the recovery of unoxidised alkyl benzene hydrocarbon and the residue of alkyl benzene hydrocarbon peroxide recovered.

10. A process according to claim 1 wherein the disperse phase is, after the oxidation, separated from the continuous phase by breaking the emulsion, treating the separated oily phase with a concentrated alkaline solution and crystallising out the peroxide in the form of its salt.

11. A process according to claim 1 wherein the disperse phase is, after the oxidation, separated from the continuous phase by breaking the emulsion, treating the separated oily phase with a concentrated aqueous solution of an alkali metal hydroxide and crystallising out the alkali metal salt of the peroxide.

12. A process according to claim 1 wherein the disperse phase is, after the oxidation, separated from the continuous phase by breaking the emulsion, treating the separated oily phase with a concentrated aqueous solution of an alkali metal hydroxide and crystallising out the alkali metal salt of the peroxide and thereafter acidifying the aqueous residue and recovering precipitated peroxide therefrom.

13. A process according to claim 1 wherein the reaction mixture is treated with an excess of a dilute aqueous solution of an alkali metal hydroxide, the aqueous phase separated from the oily phase and the peroxide recovered from the separated aqueous phase by acidification thereof.

14. A process according to claim 1 wherein said hydrocarbon contains more than one alkyl substituent having a tertiary carbon atom in the alpha position to the benzene ring.

REGINALD HAROLD HALL.
DENIS CHESELDEN QUIN.

REFERENCES CITED

The following references are of record in the file of this patent:

UNITED STATES PATENTS

| Number | Name | Date |
| --- | --- | --- |
| 1,754,913 | Stoddard et al. | Apr. 15, 1930 |
| 1,815,985 | Pansegrau | July 28, 1931 |
| 2,132,588 | Straub | Oct. 11, 1938 |
| 2,434,888 | Rust et al. | Jan. 20, 1948 |
| 2,449,347 | Vaughn et al. | Sept. 14, 1948 |

FOREIGN PATENTS

| Number | Country | Date |
| --- | --- | --- |
| 99,523 | Switzerland | June 1, 1923 |